(12) United States Patent
Bonacini

(10) Patent No.: US 7,455,097 B2
(45) Date of Patent: Nov. 25, 2008

(54) MACHINE FOR FITTING AND REMOVING VEHICLE WHEELS

(75) Inventor: Maurizio Bonacini, Correggio (IT)

(73) Assignee: Giuliano S.p.A., Correggio (RE) (IT)

( * ) Notice: Subject to any disclaimer, the term of this patent is extended or adjusted under 35 U.S.C. 154(b) by 0 days.

(21) Appl. No.: 11/892,876

(22) Filed: Aug. 28, 2007

(65) Prior Publication Data
US 2008/0060767 A1   Mar. 13, 2008

(30) Foreign Application Priority Data
Sep. 8, 2006   (IT) .......................... MO2006A0275

(51) Int. Cl.
*B60C 25/135*   (2006.01)
(52) U.S. Cl. .................... 157/1.24; 157/1.17; 157/1.22
(58) Field of Classification Search ................ 157/1.17, 157/1.22, 1.24
See application file for complete search history.

(56) References Cited

U.S. PATENT DOCUMENTS 5,226,465 A * 7/1993 Schon et al. ............... 157/1.28
5,758,703 A * 6/1998 Mimura ..................... 157/1.28
6,422,285 B1 * 7/2002 Gonzaga .................... 157/1.24

FOREIGN PATENT DOCUMENTS

EP   1048496   11/2000
EP   1475252   11/2004

* cited by examiner

*Primary Examiner*—Joseph J. Hail, III
*Assistant Examiner*—Shantese McDonald
(74) *Attorney, Agent, or Firm*—Dykema Gossett PLLC

(57) ABSTRACT

A machine for fitting and removing vehicle wheels includes a base frame, a clamping and rotating device for clamping and rotating the rim of a vehicle wheel around a horizontal rotation axis, which are fitted on the base frame by interposing straight first guide means along a vertical sliding direction and at least one operating arm which is associated with the base frame along an oblique direction with respect to the position plane of the rotation axis and of the sliding direction and which has a work tool for fitting and removing a tire onto and from the rim. The operating arm is positionable in an operating position in which it is arranged at right angles and incidental to the rotation axis and the work tool is positioned near the circumferential edge of the rim. The machine also includes a transformation device for transforming the sliding movement of the clamping and rotating device into a movement of variation of the inclination of the operating arm in which the arm itself is kept continuously in the operating position as the position of the clamping and rotating device changes along the sliding direction.

17 Claims, 4 Drawing Sheets

MACHINE FOR FITTING AND REMOVING VEHICLE WHEELS

FIELD OF THE INVENTION

The present invention refers to a machine for fitting and removing vehicle wheels.

BACKGROUND OF THE INVENTION

As is known, vehicle wheels generally comprise a metal rim with ring-shaped turn-ups that are arranged on the outer circular edge and which act as an adherent stop for the beads of an elastic tire.

The use is also currently known of so-called "tire changing" machines for removing and fitting tires from and onto their relevant rims for carrying out, for example, inner tube maintenance, repair or replacement jobs.

These tire changing machines are essentially composed of a base frame which supports a series of tools needed to fit and remove the tire.

The tools on traditional tire changing machines are usually of two types: bead breaking tools, for insertion between the tire beads and the corresponding ring-shaped turn-ups of the rim to detach these, and extraction tools, also called "claws", having a curved end part suitable for fastening onto the tire beads and moving these away from the relevant rim.

Use of the tools on the wheel occurs while this is rotated on special clamping and rotating device for clamping and rotating the wheel rim.

The rotation axis defined by the clamping and rotating device can be vertical or horizontal.

The tire changing machines with vertical rotation axis usually have a vertical spindle fitted on the base frame in a fixed way, and a series of tool supporting arms that can be moved closer and away from the wheel depending on the size of the rim and the tire.

The movement of the supporting arms occurs along radial approach and away movement directions with respect to the wheel centre and, therefore, without substantially changing the position of the tools with respect to the rim; both the bead breaking tools and the extraction tools, in fact, are turned towards the wheel centre whatever the diameter dimensions of the rim.

The tire chaining machines with horizontal rotation axis on the other hand have a horizontal spindle fitted on the base frame in a moving way along guide means, mostly vertical.

In this type of machine, the extraction tool is kept suspended at a pre-established height and is positioned on the vertical position plane of the horizontal rotation axis; depending on the diameter dimensions of the wheel, consequently, the rim fitted on the spindle is moved closer to and away from the extraction tool.

The bead breaking tools, on the other hand, are fitted on specific arms positioned obliquely with respect to the vertical position plane of the rotation axis.

These traditional tire changing machines with horizontal rotation axis have a number of drawbacks including the fact that they are not always functional and practical to use.

In this respect, it must be noted that the lowering and lifting of the spindle often results in the rotation axis and the supporting arms being crooked.

This results in incorrect operation of the bead breaking tools which, on the contrary, are designed to operate correctly in a position in which the relevant supporting arms are positioned at right angles and incident to the spindle rotation axis.

The work done on the wheel beads can therefore be difficult and irregular, and can cause excess deformations and/or defects to the tire and the bead breaking tools.

OBJECT OF THE INVENTION

The main aim of the present invention is to provide a machine for fitting and removing the wheels of vehicles that is more functional and practical to use compared to the traditional machines, that ensures correct and easy fitting and removal of the tire and at the same time allows safe use of the tools used.

Another object of the present invention is to provide a machine for fitting and removing the wheels of vehicles that permits overcoming the mentioned drawbacks of prior art within the scope of a simple, rational and low-cost solution.

SUMMARY OF THE INVENTION

The above-mentioned objects are all achieved by this machine for fitting and removing vehicle wheels, including a base frame, a clamping and rotating device for clamping and rotating the rim of a vehicle wheel around a substantially horizontal rotation axis, which are fitted on the base frame by interposing first guide means substantially straight along a substantially vertical sliding direction, at least one operating arm which is associable with the base frame along an oblique direction with respect to the position plane of the rotation axis and of the sliding direction and which has at least one work tool for fitting and removing a tire onto and from the rim, the operating arm being positionable in an operating position in which it is arranged substantially at right angles and incidental to the rotation axis and the work tool is positioned near the circumferential edge of the rim, wherein the machine includes a transformation device for transforming the sliding movement of the clamping and rotating device into a movement of variation of the inclination of the operating arm in which the arm itself is kept continuously in the operating position as the position of the clamping and rotating device changes along such sliding direction.

BRIEF DESCRIPTION OF THE DRAWINGS

Further characteristics and advantages of the present invention will appear even more evident from the detailed description of a preferred, but not exclusive, embodiment of a machine for fitting and removing vehicle wheels, illustrated indicatively by way of non limiting example, in the attached drawings wherein.

DETAILED DESCRIPTION OF THE PREFERRED EMBODIMENT(S)

Figure 1:
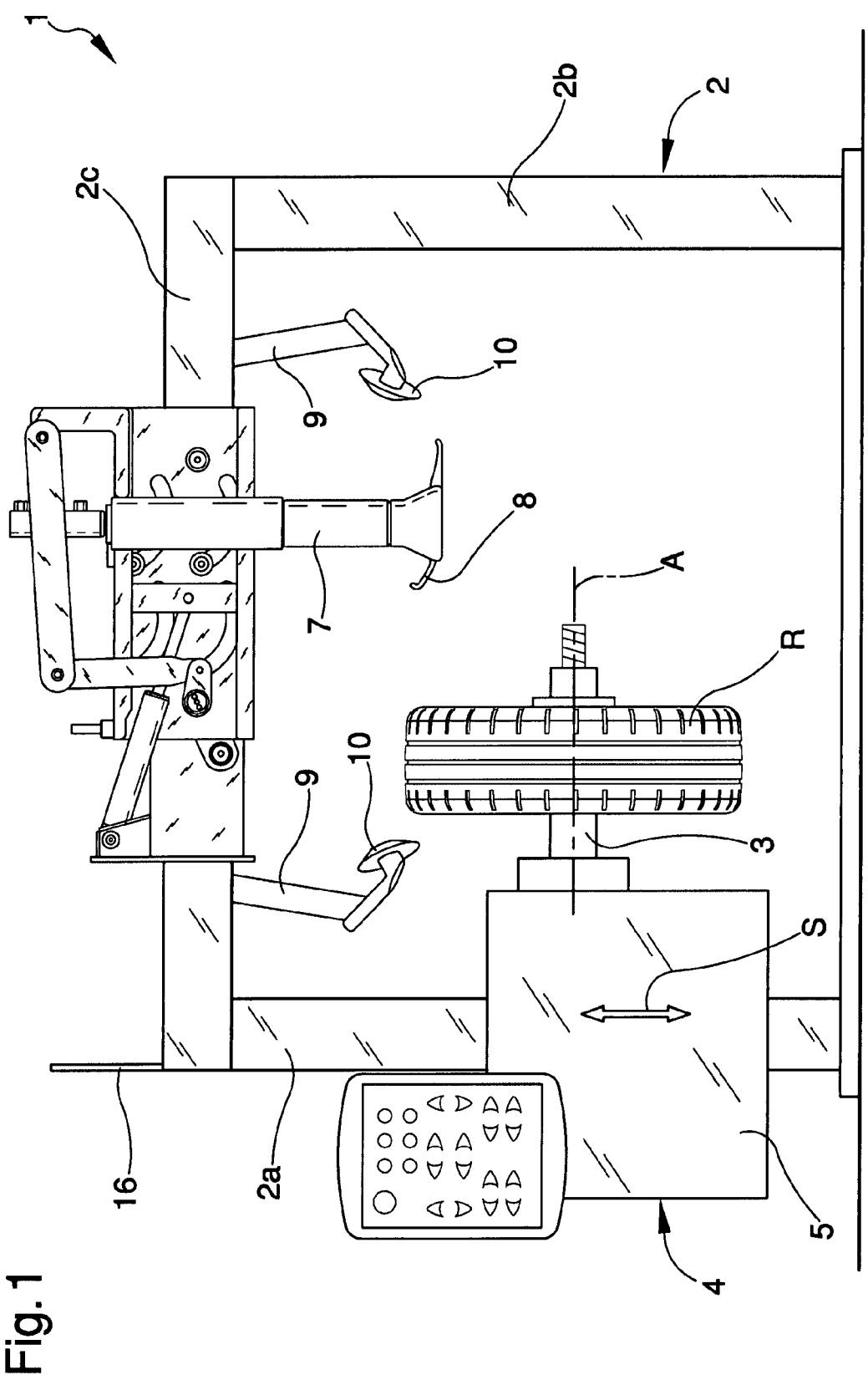
FIG. 1 is a front view of the machine according to the invention.

With particular reference to such figures, a machine for fitting and removing vehicle wheels has been globally indicated by 1.

The machine 1 includes a base frame 2 which is formed of first and second uprights 2a and 2b which extend from the ground along an approximately vertical direction and which are joined at the top by means of a connecting horizontal transom 2c.

To the base frame 2 is associated a clamping and rotating device 3 for clamping and rotating the rim C of a wheel R for vehicles around a rotation axis A arranged horizontally.

The clamping and rotating device 3 is formed of a rotating spindle that is fitted on the base frame 2 by interposition of straight first guide means 4 along a substantially vertical sliding direction S.

In particular, the first guide means 4 includes a first slide 5 that supports the spindle 3 and which is slidingly movable along the first upright 2a of the base frame 2.

The sliding action of the first slide 5 is obtained by means of a first linear actuator 6, of the type, for example, of a pneumatic, hydraulic cylinder or the like; in detail, the liner 6a of the first linear actuator 6 is fitted on the first slide 5 while the rod 6b is associated with the feet of the first upright 2a.

Slidingly movable along the horizontal transom 2c of the base frame 2 is an operating head 7 having an extractor tool 8 for fitting and removing a tire onto and from the rim C of the wheel R.

The operating head 7 is arranged coplanar with the position plane of the rotation axis A and the sliding direction S and extends longitudinally along a direction parallel with the sliding direction S.

With the horizontal transom 2c of the base frame 2, two operating arms 9 are also associated provided with a work tools 10 for fitting and removing the tire onto and from the rim C; the work tools 10 are formed, for example, of corresponding bead breaking discs.

The operating arms 9 are arranged at opposite sides of the operating head 7 to work opposite sides of the wheel and extend along directions parallel to each other and oblique with respect to the position plane of the rotation axis A and of the sliding direction S.

The operating arms 9, in particular, can be positioned in an operating position in which they are arranged substantially at right angles and incident to the rotation axis A and at least one of the work tools 10 is positioned close to the circumferential edge of the rim C.

The machine 1 includes a transformation device 11 for transforming the sliding movement of the spindle 3 into a particular movement of the operating arms 9 in which the arms themselves change their angle in space and remain continuously in the operating position as the spindle 3 gradually moves along the sliding direction S.

Such transformation device have a supporting structure of the operating arms 9 which is associated at the top of the first upright 2a by interposition of means of rotation around a swinging axis B parallel to the rotation axis A.

The supporting structure, in detail, is formed of a plate-shaped bracket 12 that is arranged at right angles to the swinging axis B around which it is hinged.

Figure 4:
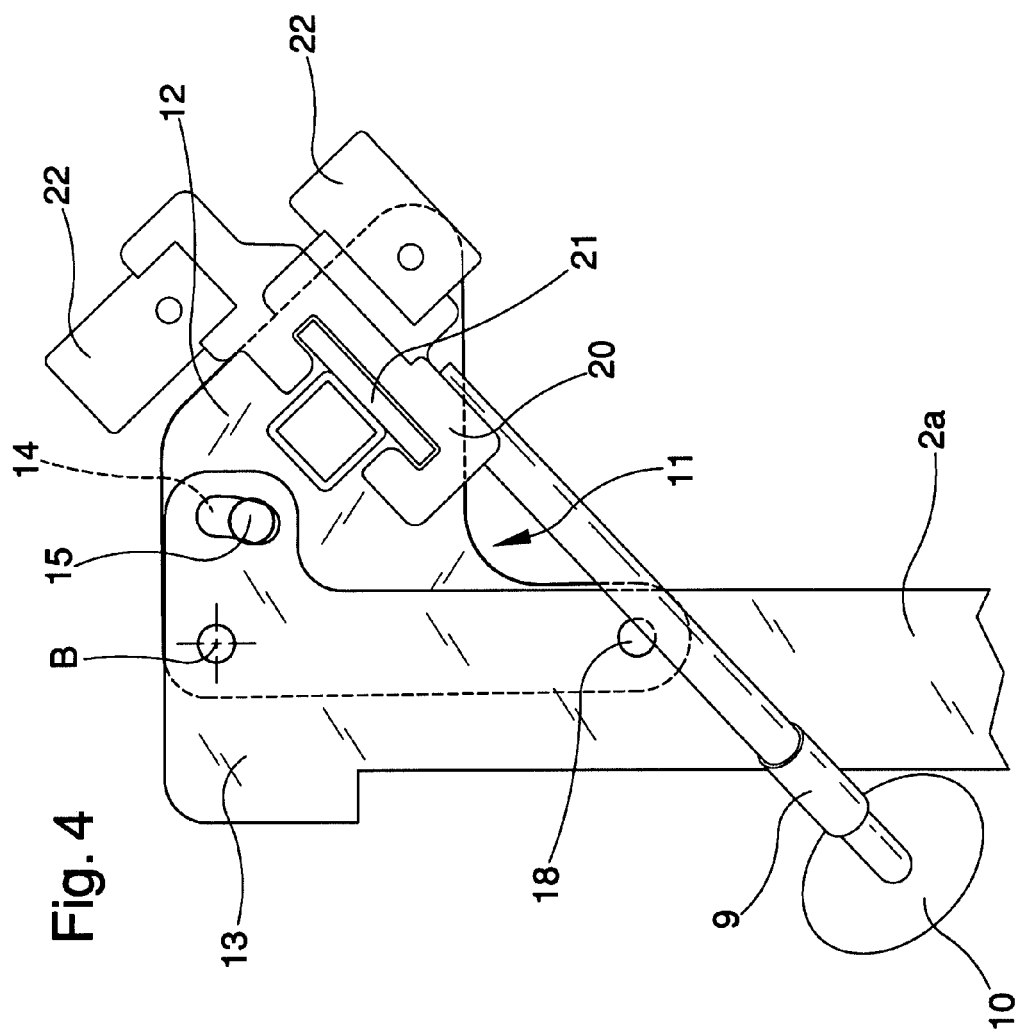
FIG. 4 is a side view of a part of the machine according to the invention.
Figure 5:
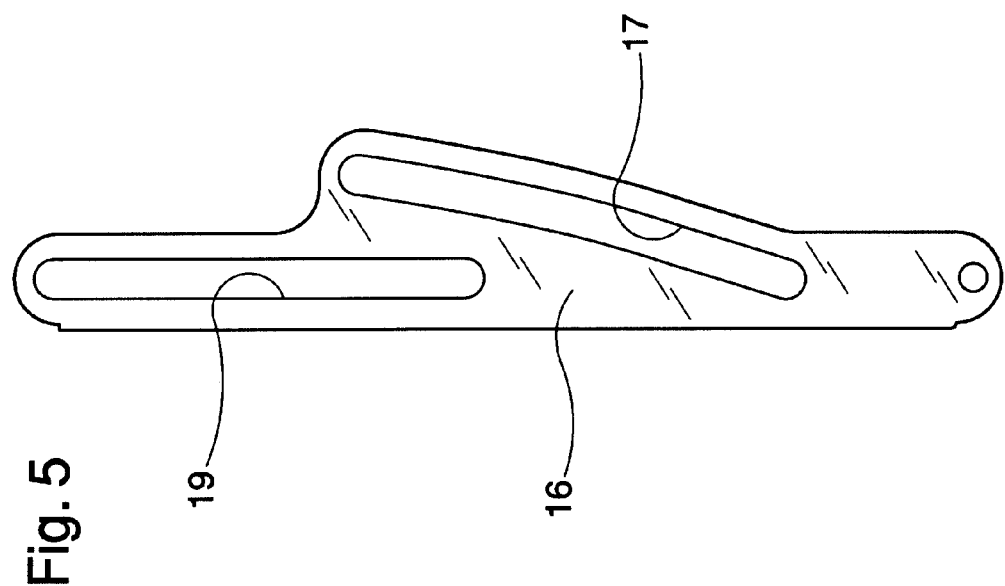
FIG. 5 is a side view of the machine plate according to the invention.

The bracket 12 is furthermore facing and adjacent to a surface 13 of the first upright 2a on which a through opening 14 is obtained (FIG. 4) shaped according to a circumference arc with its centre at the hinging point between the first upright 2a and the bracket 12.

The through opening 14 is engaged by a hinge 15 associated with the bracket 12 and, in fact, acts as a guide for the swinging of the bracket 12 with respect to the base frame 2.

The transformation device 11 also includes a plate 16 that is associated integral with the first slide 5 supporting the spindle 3 and which extends along the first upright 2a until it shows at least one portion facing and adjacent to the bracket 12.

On the plate 16 a first slot 17 is obtained elongated and engaged by a first pin 18 associated with the bracket 12; advantageously, the path defined by the first slot 17 is suitable for determining the swinging movement of the bracket 12 and the change in the inclination of the operating arms 9 to enable them to continuously maintain the operating position.

On the plate 16, a through second slot 19 is also obtained elongated and straight, which extends parallel to the sliding direction S and which is engaged by a second pin connected to the bracket 12 and coincident with the swinging axis B. The second slot 19 does in fact act as a guide for the sliding of the plate 16 along the sliding direction S with respect to the base frame 2.

The operating arms 9 are fitted on the supporting structure by interposition of straight second guide means defined along a direction parallel to the rotation axis A.

Such second guide means is formed of a pair of second slides 20 that each support a corresponding operating arm 9 and which are engaged sliding along a bar 21.

The bar 21, in detail, is associated at right angles with the bracket 12 and extends parallel to the rotation axis A.

Adjacent and parallel to the bar 21 are two corresponding second actuators 22 which drive the second slides 20; each second actuator is of the type of a pneumatic, hydraulic cylinder or the like, and has one end associated with the bracket 12 and the opposite end associated with a corresponding second slide 20.

The operation of the machine 1 is as follows.

Depending on the dimensions of the rim C fitted on the spindle 3, the first slide 5 is arranged more or less distant from the ground and from the extractor tool 8. In the case of a rim of limited dimensions (FIG. 2), for example, the spindle 3 is arranged close to the extractor tool 8 while the bracket 12 and the plate 16 are arranged so that the first pin 18 is arranged at the base of the first slot 17.

Figure 2:
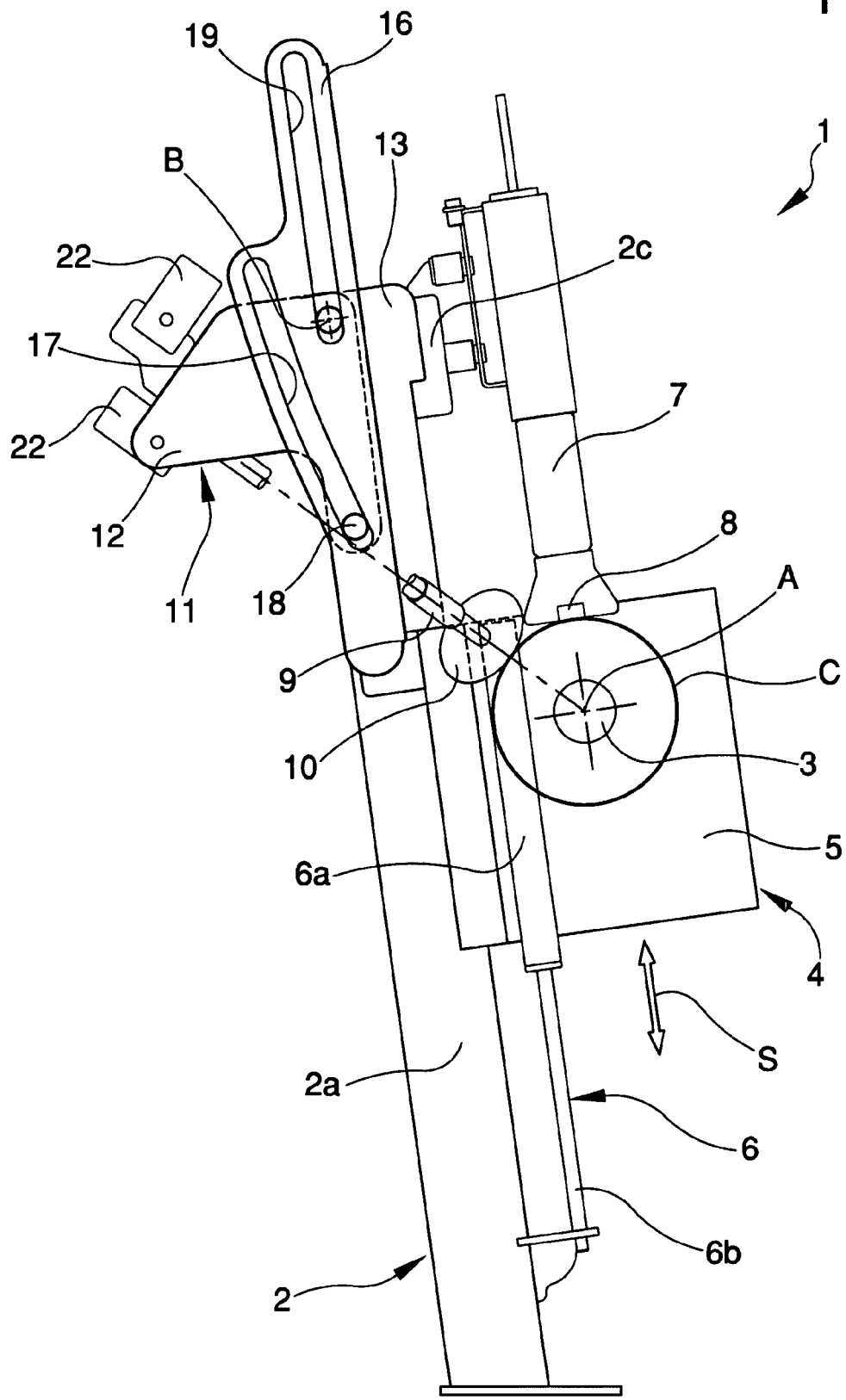
FIG. 2 is a side view of the machine according to the invention in small-size rim working phase.

In this position the operating arm 9 shown in FIG. 2 is positioned in operating position and, in particular, is directed towards the centre of the rim C.

To work rims C of larger dimensions (FIG. 3), on the other hand, the spindle 3 is lowered with respect to the position shown in FIG. 2; the downward sliding of the first slide 5 and of the plate 16 causes the first pin 18 to slide along the first slot 17 causing the bracket 12 to rotate around the swinging axis B.

Figure 3:
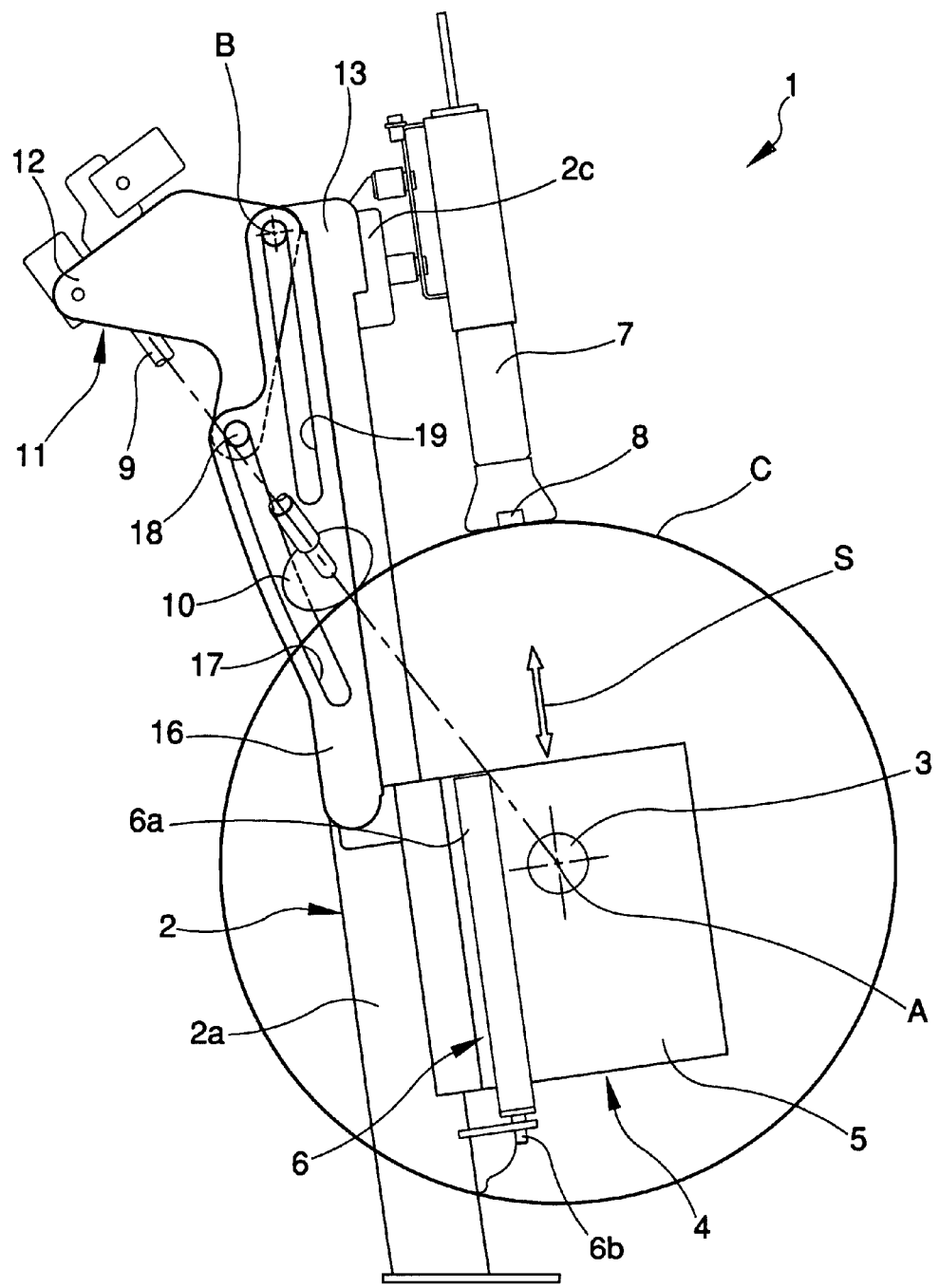
FIG. 3 is a side view of the machine according to the invention in large-size rim working phase.

The operating arm 9, shown in FIG. 3, rotates significantly following the movement of the centre of the rim C and remains continuously in operating position.

It has in fact been seen how the described invention achieves the set objects.

The invention thus conceived is susceptible of numerous modifications and variations, all of which falling within the scope of the inventive concept.

Furthermore all the details may be replaced by other elements which are technically equivalent.

In practice, the materials used, as well as the contingent shapes and dimensions, may be any according to requirements without because of this moving outside the protection scope of the following claims.

The invention claimed is:

1. A machine for mounting and removing vehicle wheels comprising:
a base frame,
a clamping and rotating device for clamping and rotating a rim of a vehicle wheel around a substantially horizontal rotation axis,
first guide means for moving said clamping and guiding means substantially linearly in a substantially vertical sliding direction,
an operating arm mounted on said base frame and which extends obliquely with respect to a position plane defined by said rotation axis and said sliding direction, said operating arm including a work tool for mounting and removing a tire relative to a rim, said operating arm being positionable in an operating position at substantially right angles and incidental to said rotation axis and work tool is located near a circumferential edge of said rim,
a transformation device for transferring sliding movement of said clamping and rotating device into a varying movement of inclination of said operating arm in which the arm is continuously maintained in said operating position as a position of said clamping and rotating device changes in said sliding direction, said transformation device comprising at least one supporting structure of said operating arm which is associated with said base frame by interposition of means of rotation around a swinging axis substantially parallel to said rotation axis, at least one substantially plate-shaped and vertical bracket hinged to said base frame around said swinging axis, at least one plate integral with said clamping and rotating device and arranged substantially facing and adjacent to said bracket and at least one elongated first slot on at least one of said bracket and said plate and engaged by a first pin with the other of said bracket and said plate, a path defined by said first slot being suitable for determining the swinging movement of said bracket and the change in the inclination of said operating arm.

2. A machine according to claim 1, wherein said bracket faces and is adjacent to at least one surface of said base frame.

3. A machine according to claim 2, wherein one of said bracket and said surface has an opening shaped according to a circumference arc with its centre at the hinging point between said base frame and said bracket, and engaged by a hinge connected to the other of said bracket and said surface.

4. A machine according to claim 3, wherein said opening is a through opening on said base frame.

5. A machine according to claim 1, wherein said first slot is a through slot on said plate.

6. A machine according to claim 1, wherein said transformation device comprise at least an elongated second slot substantially parallel with said sliding direction on one of said bracket and said plate and engaged by a second pin connected to the other of said bracket and said plate.

7. A machine according to claim 6, wherein said second slot is a through slot on said plate.

8. A machine according to claim 6, wherein said second pin coincides with said swinging axis.

9. A machine according to claim 1, wherein said first guide means comprise a first slide supporting said clamping and rotating device and which slides along a substantially vertical upright of said base frame.

10. A machine according to claim 9, wherein said first guide means comprise a first linear actuator to drive the sliding of said first slide that has opposite ends connected to said base frame and said first slide, respectively.

11. A machine according to claim 1, wherein said operating arm is fitted on said supporting structure by interposition of substantially straight second guide means defined along a direction substantially parallel to said rotation axis.

12. A machine according to claim 11, wherein said second guide means comprise at least a second slide supporting said operating arm which is slidingly engaged along a bar substantially parallel to said rotation axis which is associated with one substantially plate-shaped and vertical bracket hinged to said base frame around said swinging axis.

13. A machine according to claim 12, wherein said second guide means comprise at least a second linear actuator to drive the sliding of said second slide that has the opposite ends associated with said bracket and with said second slide, respectively.

14. A machine according to claim 1, comprising at least two of said operating arms to work opposite sides of said wheel.

15. A machine according to claim 1, wherein said work tool is a bead breaking disc.

16. A machine according to claim 1, comprising at least one operating head mounted on said base frame and having an extractor tool for mounting and removing said tire relative to said rim.

17. A machine according to claim 16, wherein said operating head is arranged substantially coplanar with a position plane defined by said rotation axis and said sliding direction.

* * * * *